(12) United States Patent
Suprick et al.

(10) Patent No.: US 9,938,805 B2
(45) Date of Patent: Apr. 10, 2018

(54) METHOD FOR MONITORING AND OPTIMIZING THE PERFORMANCE OF A WELL PUMPING SYSTEM

(71) Applicant: MTS Systems Corporation, Eden Prairie, MN (US)

(72) Inventors: Joseph Bernard Suprick, Pittsboro, NC (US); John Matthew Hankinson, Cary, NC (US); John William Balding, Holly Springs, NC (US); Michael Stephen Wardle, Raleigh, NC (US)

(73) Assignee: MTS SYSTEMS CORPORATION, Eden Prairie, MN (US)

( * ) Notice: Subject to any disclaimer, the term of this patent is extended or adjusted under 35 U.S.C. 154(b) by 343 days.

(21) Appl. No.: 14/611,814

(22) Filed: Feb. 2, 2015

(65) Prior Publication Data

US 2015/0308242 A1 Oct. 29, 2015

Related U.S. Application Data

(60) Provisional application No. 62/049,534, filed on Sep. 12, 2014, provisional application No. 61/934,398, filed on Jan. 31, 2014.

(51) Int. Cl.
*E21B 43/12* (2006.01)
*E21B 47/00* (2012.01)
(Continued)

(52) U.S. Cl.
CPC ........ *E21B 43/127* (2013.01); *E21B 47/0008* (2013.01); *F04B 47/022* (2013.01); *G05B 15/02* (2013.01); *E21B 2043/125* (2013.01)

(58) Field of Classification Search
CPC ........................... E21B 47/0008; F04B 47/022
(Continued)

(56) References Cited

U.S. PATENT DOCUMENTS 2,550,093 A   4/1951  Smith
2,697,984 A   12/1954 Pankratz
(Continued)

FOREIGN PATENT DOCUMENTS

CA    2526345        4/2007
CA    2765260 A1     12/2010
(Continued)

OTHER PUBLICATIONS

Kwun et al., "Recent Developments in Nondestructive Evaluation of Steel Strands and Cables Using Magnetostricitve Sensors" Oceans '96. MTS/IEEE. Conference Proceedings Prospects for the 21st Century, Sep. 23-26, 1996 pp. 144-148.*

(Continued)

*Primary Examiner* — Emilio J Saavedra
(74) *Attorney, Agent, or Firm* — Steven M. Koehler; Westman, Champlin & Koehler, P.A.

(57) ABSTRACT

A system for controlling a speed of a pump jack system having a variable speed prime mover includes a sensor attached to the pump jack system. The sensor is capable of detecting an absolute position of a first component of the pump jack system relative to a second component of the pump jack system and configured to send a signal proportional to the sensed absolute position and/or velocity and/or acceleration. The system includes process circuitry configured to accept the signal and perform a calculation related to absolute position and/or velocity and/or acceleration of the first component relative to the second component. The system includes a controller that is configured to receive the signal from the process circuitry and configured to send a signal to the prime mover to adjust a rotational speed of the prime mover and the position of the first component relative to the second component.

12 Claims, 5 Drawing Sheets

(51) Int. Cl.
*F04B 47/02* (2006.01)
*G05B 15/02* (2006.01)

(58) Field of Classification Search
USPC .......................................................... 700/282
See application file for complete search history.

(56) References Cited

U.S. PATENT DOCUMENTS

| | | |
|---|---|---|
| 2,707,440 A | 5/1955 | Schneider et al. |
| 3,050,003 A | 8/1962 | Edwards |
| 3,075,466 A | 1/1963 | Agnew et al. |
| 3,091,179 A | 5/1963 | Echols |
| 3,105,443 A | 10/1963 | Johnson |
| 3,219,107 A | 11/1965 | Brown, Jr. et al. |
| 3,247,798 A | 4/1966 | Glasgow et al. |
| 3,453,962 A | 7/1969 | Strader |
| 3,824,851 A | 7/1974 | Schwartz |
| 3,838,597 A | 10/1974 | Montgomery et al. |
| 3,851,995 A | 12/1974 | Mills |
| 3,854,846 A | 12/1974 | Douglas |
| 3,918,843 A | 11/1975 | Douglas et al. |
| 3,930,752 A | 1/1976 | Douglas |
| 3,936,231 A | 2/1976 | Douglas |
| 3,938,910 A | 2/1976 | Douglas |
| 3,963,374 A | 6/1976 | Sullivan |
| 4,006,752 A | 2/1977 | De Vale |
| 4,034,808 A | 7/1977 | Patterson |
| 4,286,925 A | 9/1981 | Standish |
| 4,302,157 A | 11/1981 | Welton et al. |
| 4,311,438 A | 1/1982 | Comstedt |
| 4,329,120 A | 5/1982 | Walters |
| 4,413,676 A | 11/1983 | Kervin |
| 4,473,338 A | 9/1984 | Garmong |
| 4,480,960 A | 11/1984 | Streib |
| 4,487,061 A | 12/1984 | McTamaney et al. |
| 4,490,094 A | 12/1984 | Gibbs |
| 4,499,347 A | 2/1985 | Richards |
| 4,502,325 A | 3/1985 | Klomp |
| 4,507,055 A | 3/1985 | Fair et al. |
| 4,541,274 A | 9/1985 | Purcupile |
| 4,561,299 A * | 12/1985 | Orlando .............. E21B 47/0008 33/366.14 |
| 4,569,233 A | 2/1986 | Rosaen |
| 4,594,665 A | 6/1986 | Chandra et al. |
| 4,628,743 A | 12/1986 | Miller, Jr. et al. |
| 4,661,751 A | 4/1987 | Werner |
| 4,973,226 A | 11/1990 | McKee |
| 5,222,867 A | 6/1993 | Walker, Sr. et al. |
| 5,224,834 A | 7/1993 | Westerman et al. |
| 5,246,076 A | 9/1993 | Watson |
| 5,362,206 A | 11/1994 | Westerman et al. |
| 5,601,413 A | 2/1997 | Langley et al. |
| 5,678,981 A | 10/1997 | Dunham |
| 5,846,056 A | 12/1998 | Dhindsa et al. |
| 5,941,305 A | 8/1999 | Thrasher et al. |
| 6,041,856 A | 3/2000 | Thrasher et al. |
| 6,155,347 A | 12/2000 | Mills |
| 6,263,730 B1 | 7/2001 | Grande et al. |
| 6,497,561 B2 | 10/2002 | Skillman |
| 6,599,095 B1 | 7/2003 | Takada et al. |
| 7,168,924 B2 | 1/2007 | Beck et al. |
| 7,668,694 B2 | 2/2010 | Anderson et al. |
| 7,762,339 B2 | 7/2010 | Bevan et al. |
| 7,869,978 B2 | 1/2011 | Anderson et al. |
| 7,931,447 B2 | 8/2011 | Levin et al. |
| 8,180,593 B2 | 5/2012 | Anderson et al. |
| 8,249,826 B1 | 8/2012 | Anderson et al. |
| 8,327,931 B2 | 12/2012 | Agrawal et al. |
| 8,417,483 B2 | 4/2013 | Anderson et al. |
| 8,441,222 B2 | 5/2013 | Manzarek et al. |
| 8,444,393 B2 | 5/2013 | Beck et al. |
| 2006/0067834 A1* | 3/2006 | Boyer ..................... F04B 47/02 417/44.1 |
| 2008/0240930 A1 | 10/2008 | Palka |
| 2013/0030721 A1* | 1/2013 | Palka .................... F04B 47/026 702/41 |
| 2013/0151216 A1 | 6/2013 | Palka |

FOREIGN PATENT DOCUMENTS

| | | |
|---|---|---|
| EP | 0213838 A1 | 3/1987 |
| FR | 690387 A | 9/1930 |
| JP | H11241687 | 9/1999 |
| WO | 1983000220 A1 | 1/1983 |
| WO | 1997038207 A1 | 10/1997 |
| WO | 2007112333 A2 | 10/2007 |
| WO | 2012065257 A1 | 5/2012 |

OTHER PUBLICATIONS

Notification of Transmittal of the International Search Report and the Written Opinion for International patent application No. PCT/US2015/014075, filed Feb. 2, 2015, dated Jun. 29, 2015.

* cited by examiner

METHOD FOR MONITORING AND OPTIMIZING THE PERFORMANCE OF A WELL PUMPING SYSTEM

BACKGROUND

The discussion below is merely provided for general background information and is not intended to be used as an aid in determining the scope of the claimed subject matter.

Aspects of the present disclosure relate to a method of monitoring aspects of a well pumping system while operating and/or optimizing the performance of the well pumping system, and a system for monitoring aspects of the system while operating and/or optimizing the performance of the well pumping system. One industry where the monitoring of the pump jack system is in the exploration and production of oil in an oil field. However, a pump jack system can also be utilized in other industries besides the production of oil.

When a pump jack system is installed, a down-hole pump assembly is secured to a sucker rod and positioned within the well. A polished rod (sucker rod carrier) is attached to the sucker rod where the polished rod moves through a casing head at the ground level of the hole and a stuffing box. The stuffing box provides a seal and prevents oil from exiting between the interface between the stuffing box and the polished rod.

A bridle bar is coupled to an upper end of the polished rod and also to an end (commonly referred to as a horsehead) of the pump jack system with a plurality of cables (bridle). The position of the bridle bar and the sucker rod carrier are manually adjusted relative to each other on the pump jack to obtain maximum pump stroke of the sucker rod without striking the bottom of the well with the down-hole pump assembly. Once the optimum position of the polished rod and bridle bar are determined, the position of the polished rod and the bridle bar are fixed, typically with a clamp positioned about a circumference of the polished rod, or some other frictional engagement.

Over time, the clamp that is secured to the polished rod has a tendency of working loose or moving on the polished rod, or the down rod string stretches, which can adversely affect the performance of the well. The movement of the clamp on the polished rod causes the polished rod to move downward relative to the bridle bar. When the polished rod moves downwardly relative to the bridle bar, the down-hole section of the pump can strike the bottom of the well on the down stroke of the pump jack, which is commonly referred to as bottoming out. This action reduces the amount of oil produced with each pump cycle and can cause damage to the pumping system from the shock or impact caused by the down-hole section hitting the bottom as well.

When the down-hole section strikes the bottom of the well, the downward movement of the sucker rod and the polished rod is abruptly stopped. However, the bridle bar continues to move downwardly until the pump jack completes the downward stroke. As the pump jack reverses direction and moves in its upward stroke, the bridle bar moves upwardly quickly because there is no resistance from the sucker rod or the down-hole pump assembly. At some point during the upward stroke, the bridle bar re-engages the clamp attached to the polished rod and causes additional shock to the pump jack system due to the impact between the bridle bar and the clamp attached to the polished rod.

The operation of the jack pump system can also be adversely affected when the movement of the polished rod through the stuffing box and/or the well casing and/or the rod guides becomes restricted or the downward movement of the sucker rod and/or the down-hole pump assembly becomes impeded. When the downward movement of any of the polished rod, the sucker rod or the down-hole pump assembly becomes impeded, the bridle bar will move downwardly at a faster rate than the polished rod and separate from the clamp attached to the polished rod. When the jack pump moves in the upward stroke, the bridle bar will move upwardly quickly until the bridle bar re-engages the clamp which causes a sudden deceleration and has the similar detrimental effects as when the down-hole pump assembly strikes the bottom of the well.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

Aspects of the present disclosure relate to a method of monitoring and/or optimizing the performance of a pump jack system by directly or indirectly monitoring an interface of a bridle bar and a polished rod (also referred to as sucker rod carrier) of a pump jack system with a control system which controls the pump jack system utilizing a feedback control loop.

An aspect of the present disclosure includes a system for controlling the speed of a pump jack system having a variable speed prime mover includes a sensor attached to the pump jack system. The sensor is capable of detecting an absolute position of a first component of the pump jack system relative to a second component of the pump jack system and configured to send a signal proportional to the sensed absolute position. The system includes process circuitry configured to receive the signal from the sensor and calculate a velocity or an acceleration of the first component relative to the second component. The process circuitry is configured to send a signal proportional to the absolute position and/or velocity and/or acceleration. The system includes a controller that is configured to receive the signal from the process circuitry and configured to send a signal to the prime mover to adjust the speed of the prime mover to adjust a rotational speed of the prime mover and to adjust the absolute position and/or velocity and/or acceleration of the first component relative to the second component. The system is configured to store data regarding absolute position and/or velocity and/or acceleration for later analysis and/or transmit data to a remote location regarding absolute position and/or velocity and/or acceleration for later analysis.

Another aspect of the present disclosure includes a method for controlling a pump jack system. The method includes providing the pump jack system with a variable speed prime mover and providing a sensor on the pump jack system capable of measuring absolute position and/or velocity of a first component of the pump jack system relative to a second component of the pump jack system. The absolute position and/or the velocity and/or the acceleration of the first component relative to the second component of pump jack system is sensed and a signal is sent from the sensor indicative of the absolute position or the velocity of the first component relative to the second component to process circuitry which calculates acceleration of the first component relative to the second component. A signal is sent from the process circuitry to a controller related to the absolute position and/or the velocity and/or the acceleration of the first component relative to the second component and a signal is then sent from the controller to the prime mover to adjust a rotational speed of the prime mover to adjust the absolute position and/or the velocity and/or the acceleration of the first component relative to the second component. The system is configured to store data regarding absolute position and/or velocity and/or acceleration for later analysis and/or transmit data to a remote location regarding absolute position and/or velocity and/or acceleration for later analysis.

An aspect of the present disclosure relates to a method of monitoring an interface of a bridle bar and a sucker rod carrier of a pump jack system. The method includes positioning a position sensor at the interface of the bridle bar and sucker rod carrier and utilizing the position sensor to measure the movement of the bridle bar and sucker rod relative to each other.

Another aspect of the present disclosure includes a control system that includes a position sensor located at an interface of a bridle bar and a sucker rod carrier of a pump jack system. The sensor includes positioning a waveguide of a magentorestrictive sensor on a cable coupling the bridle bar to a horsehead of the pump jack system and coupling a magnet to the polished rod of the pump jack system.

Another aspect of the present disclosure relates to a method of measuring an interface of a bridle bar and a sucker rod carrier of a pump jack system utilizing a flexible magnetorestrictive sensor. The flexible magnetorestrictive sensor is attached to a cable proximate the bridle bar and a position magnet is secured to the sucker rod carrier. During normal operation, the signal from the magnetorestrictive sensor will be substantially constant and a change in the sensed position is indicative of a performance issue with the pump jack system. The magnetorestrictive sensor can also sense and/or calculate a velocity and an acceleration of the bridle bar and sucker rod carrier intersection.

An aspect of the present disclosure relates to a method of monitoring the performance of a pump jack system comprising a base and a walking beam pivotally attached to the base. The method includes securing a member to the walking beam such that an axis of rotation of the member aligns with an axis of rotation of a walking beam. A first component of a sensor is secured to the member and located at a distance from the axis of rotation such that the first component moves in an arcuate path as the walking beam pivots about the pivot axis. A second component of the sensor is attached to the base and is configured into an arcuate configuration similar to that of the arcuate path of the first component such that the arcuate movement of the first component is sensed by the second component. The method includes utilizing the sensor to measure the pivotal movement of the walking beam relative to the base, such that among other process variables, absolute position of the walking beam and/or the velocity of the walking beam and/or acceleration of the walking beam relative to the base can be determined.

Another aspect of the present disclosure relates to a method of monitoring the performance of a pump jack system comprising a walking beam pivotally attached to a base. The method includes utilizing a magnetorestrictive sensor including a curved or arcuate waveguide and a magnet to determine an angular position of a walking beam relative to a base. The method includes securing a rigid member to the walking beam such that an axis of rotation of the rigid member aligns with an axis of rotation of the walking beam of the pump jack system. The magnet is secured to the rigid member a distance from the axis of rotation, such that the magnet moves in an arcuate path as the walking beam pivots about the pivot axis. A flexible waveguide is attached to a base and is configured into an arcuate configuration similar to that of the arcuate path of the magnet such that the flexible waveguide is in a location for sensing the arcuate movement of the magnet. The method includes utilizing the magnetorestrictive sensor to measure the pivotal movement of the walking beam, such that, among other process conditions, an absolute position of the walking beam and/or the velocity of the walking beam and/or acceleration of the walking beam relative to the base can be determined. The sensed information can then be utilized to optimize the performance of the well pumping system through a feedback control loop and to identify when the well pumping system is operating outside of acceptable parameters, which is an indication that maintenance may be required.

Another aspect of the present disclosure includes a linear position sensor attached to a walking beam and a base of a pump jack system. The linear position sensor typically is a magnetorestrictive sensor that has a curved or arcuate waveguide and a magnet to determine an angular position of a walking beam relative to a base. A rigid member is secured to the walking beam such that an axis of rotation of the rigid member aligns with an axis of rotation of the walking beam of the pump jack system. The magnet is secured to the rigid member a distance from the axis of rotation, such that the magnet moves in an arcuate path as the walking beam pivots about the pivot axis. The flexible waveguide is attached to a base and is configured into an arcuate configuration similar to that of the arcuate path of the magnet such that the flexible waveguide is in a location for sensing the arcuate movement of the magnet along an entire pumping cycle of the pump jack system.

Although a magnetostrictive sensor is particularly well-suited for use in the present disclosure, other forms of position sensors can used. Generally, such a sensor includes an elongated component (e.g. the magnetostrictive waveguide of the magnetostrictive sensor) and a fixed component (e.g. the position magnet of the magnetostrictive sensor). As another example the position sensor can comprise a linear encoder. A linear encoder is a sensor, transducer or readhead paired with a scale that encodes position. The sensor reads the scale in order to convert the encoded position into an analog or digital signal, which can then be decoded into position by a digital readout (DRO) or motion controller. Motion can be determined by change in position over time. Linear encoder technologies include optical, magnetic, inductive, capacitive and eddy current. In an alternative embodiment, velocity and/or acceleration sensor(s) suitably mounted to appropriate moving components can also be used to provide and/or derive any of the position, velocity and/or acceleration signals that are then used to control the speed of the prime mover.

DETAILED DESCRIPTION

An aspect of the present disclosure relates to a method for determining the performance of a pump jack system by directly or indirectly measuring a change in position, or lack thereof, between a bridle bar and a sucker rod carrier (polished rod) of a pump jack system. Another aspect of the present disclosure includes locating a position sensor at a selected position to directly or indirectly monitor a change in position of the sucker rod carrier relative to the bridle bar and to generate a signal from the sensor that is transmitted to a controller where the controller is utilized to manipulate the performance of the pump jack utilizing a feedback control loop.

Figure 1:
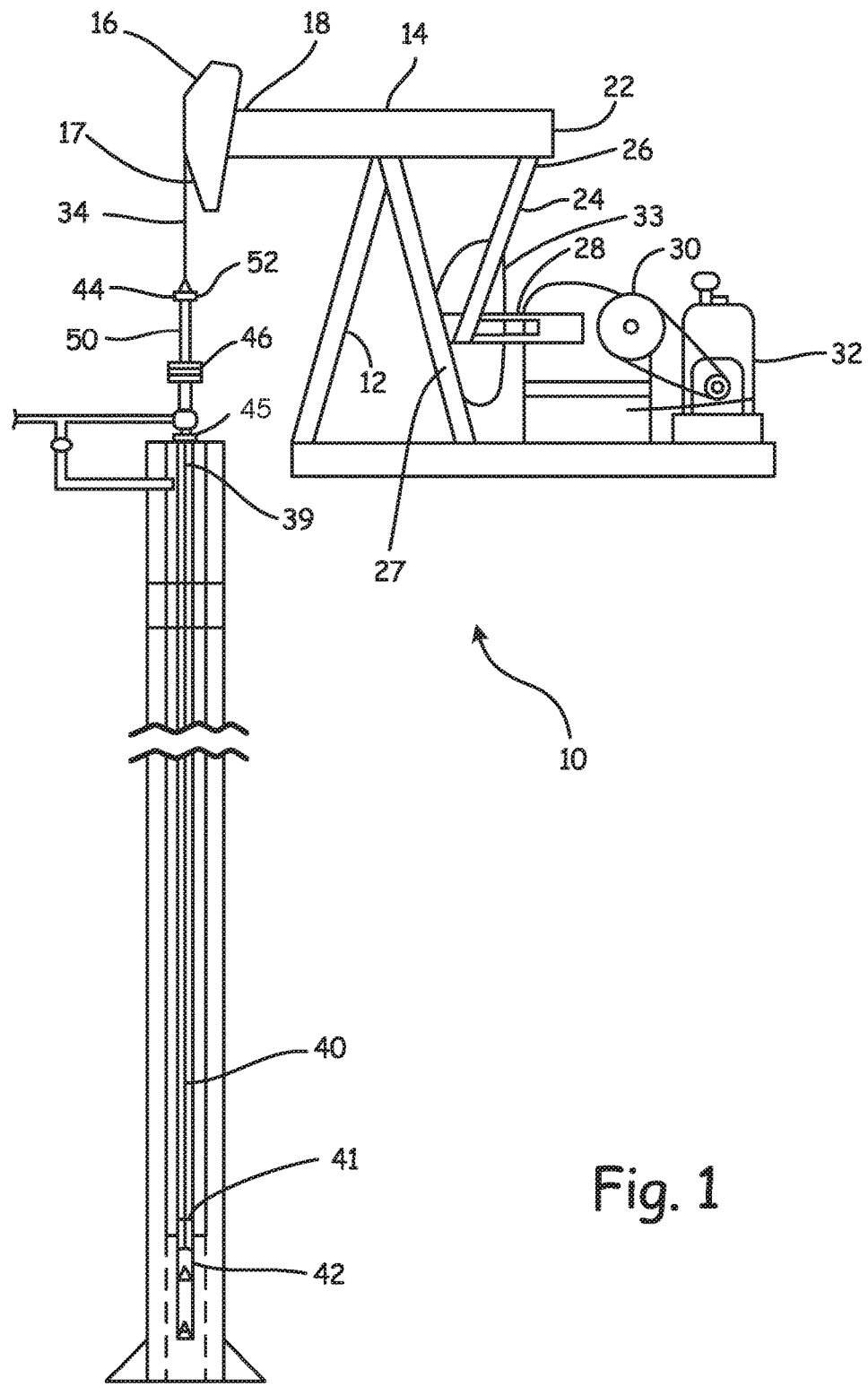
FIG. 1 is a schematic view of a pump jack system.

Referring to FIG. 1, a pump jack system is generally illustrated at 10 in a typical vertical well. However, this should not be considered limiting. For instance, the pump jack system 10 can also be utilized in a horizontally drilled well.

The pump jack system 10 includes a base 12 that supports a walking beam 14 where the walking beam 14 is pivotally attached to the base 12. An end portion 16, commonly known as a horsehead, is attached to a distal end 18 of the walking beam 14 and an optional equalizer can be secured to a proximal end 22 of the walking beam 14.

A first end 26 of a crank 24, such as a Pittman crank, is attached to the proximal end 22 of the walking beam 14 and a second end 27 of the crank 24 is attached to a crank arm 28 that engages a gear box 30 driven by a prime mover 32. The prime mover 32 is typically an electrically powered motor, such as an alternating current (AC) motor or a direct current (DC) or with a suitable motor drive, including a gas or diesel engine used to power a generator that supplies electric power to the prime mover. In one embodiment, the electric motor and motor drive comprise an adjustable speed prime mover.

The prime mover 32 drives the gear box 30 which in turn moves the crank arm 28. As the crank arm 28 moves, the crank 24 moves upward in an eccentric path, which allows the horsehead 16 and a sucker rod 40 and a down-hole section 42 of the pumping system 10 attached to the horsehead 16 to move downward. As the crank 24 is moved downward, the horsehead 16 is raised along with the sucker rod 40 and the down-hole section 42 of the pump, which causes liquid to be pumped from the well. A counterweight 33 is attached to the crank 24 to aid in raising horsehead 16.

A proximal end of at least one cable 34 commonly referred to as a bridle is attached to the horsehead 16 and has sufficient flexibility to follow a cammed surface 17 on the horsehead 16. The at least one cable 34 has sufficient strength to raise the down-hole section 42 of the pump and the sucker rod 40 along with a column of fluid within the well hole.

A distal end of the at least one cable 34 is secured to a bridle bar 44. As the horsehead 16 moves up and down, the bridle bar 44, through the engagement of the at least one cable 34 with the cammed surface 17 of the horsehead 16, also moves upward and downward in a direct relationship with the movement of the horsehead 16.

The sucker rod 40 has a down-hole end 41 to which the down-hole section 42 of the pump is attached. An upper end 39 of the sucker rod 40 is attached to a sucker rod carrier or polished rod 50 that moves through a casing head 45 at the ground level of the hole and a stuffing box 46. A tolerance between the stuffing box 46 and the polished rod 50 is sufficiently small to prevent liquid from exiting through the interface between the stuffing box 46 and the polished rod 50. The cammed surface 17 of the horsehead 16 maintains vertical alignment of the polished rod 50 to the well and the stuffing box 46 so as to minimize side load, drag and wear on the moving parts.

A top end 52 of the polished rod 50 is joined to the bridle bar 44, typically with a clamping device 54. The clamping device 54 is secured around a perimeter of the top end 52 of the polished rod 50 such that the diameter of the polished rod 50 and clamping device 54 is greater than a diameter of a through bore 43 in the bridle bar 44. In this manner, the bridle bar 44 and the polished rod 50 interface is separable to the extent that the bridle bar 44 can move downwardly faster than the polished rod 50.

Figure 2:
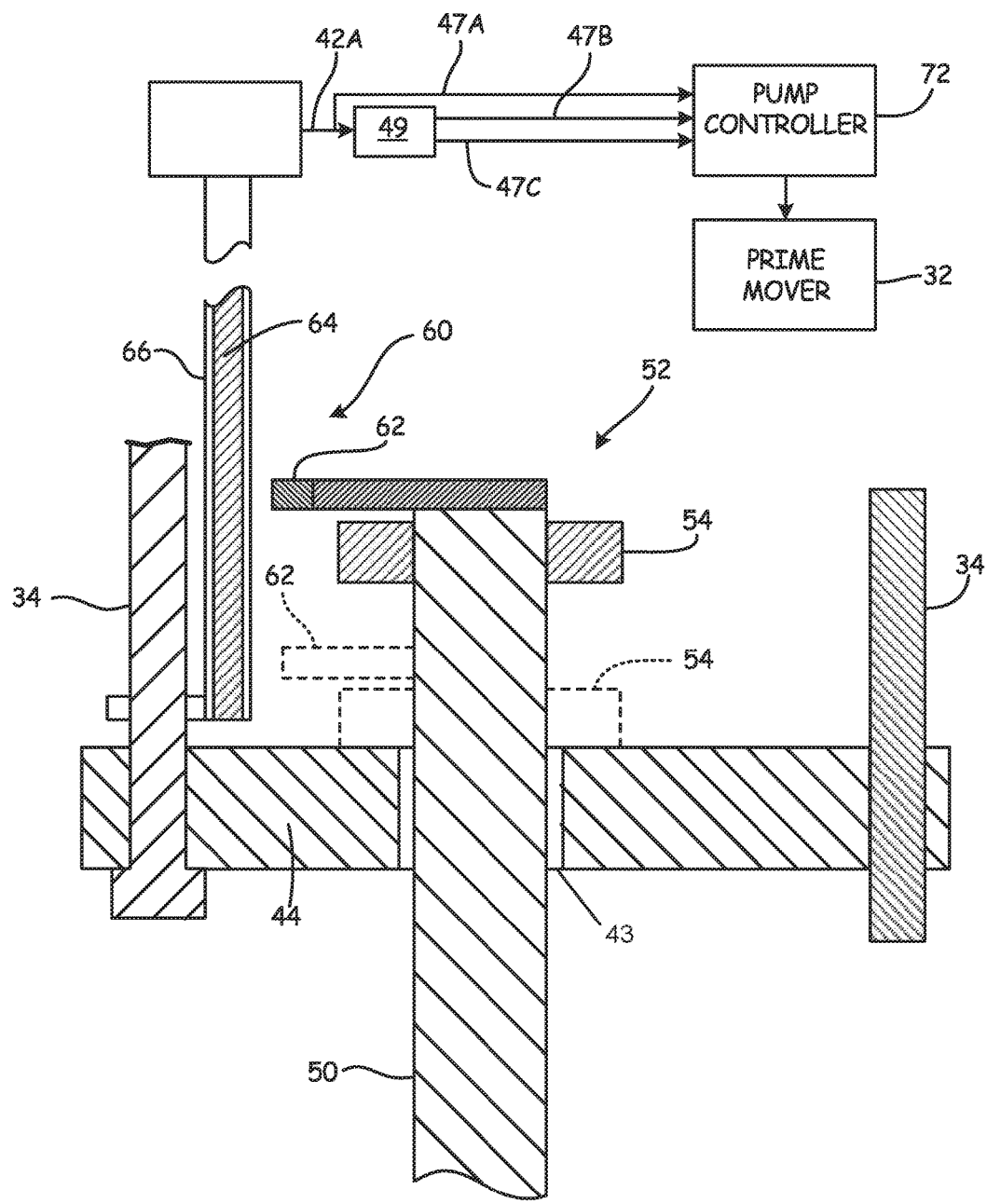
FIG. 2 is a sectional view of an interface between a bridle bar and a polished rod of a pump jack system with a linear position sensor attached thereto.

During normal operating conditions, as the horsehead 16 is moved upward, the bridle bar 44 engages the clamping device 54 and lifts the polished rod 50, the sucker rod 40 and the down-hole section 42 of the jack pump system 10 upward. This is illustrated in FIG. 2 with dashed lines when clamping device 54 engages the bridle bar 44. As the horsehead 16 moves downward, the clamping device 54 maintains engagement with the bridle bar 44 through the weight of the polished rod 50, sucker rod 40, etc. so as to maintain tension on the at least one cable 34 through the downward stroke.

However, under some operating conditions the polished rod 50 and components connected thereto do not move downwardly as fast as the bridle bar 44, in which case separation between the bridle bar 44 and the polished rod 50 occurs, as illustrated in FIG. 2 in solid lines. In one aspect of the present disclosure, a position sensor 60, preferably linear, is operably coupled to the interface of the bridle bar 44 and the polished rod 50 so as to detect separation of the bridle bar 44 from the polished rod 50 and preferably measure the extent of separation that has occurred. In the embodiment illustrated, the linear position sensor 60 includes one component 62 attached to the polished rod 50 proximate the bridle bar 44 and another component 64 attached to the at least one cable 34 connecting the bridle bar 44 to the horse head 16. Because the bridle bar 44 and the at least one cable 34 move in a non-linear or elliptical path due to the camming surface 17 on the horse head 16, it is preferable that the component 64 attached to the bridle bar 44 or the at least one cable 34 is sufficiently flexible so to bend as the at least one cable 34 bends.

In the illustrated embodiment, the linear position sensor 60 includes a flexible magnetostrictive waveguide 64 installed along the length of the at least one cable 34 proximate the bridle bar 44 and a position magnet 62 jointed to the polished rod 50. Utilizing a flexible magnetorestrictive waveguide 64 secured on the at least one cable 34 proximate the bridle bar 44 and the position magnet 62 on the polished rod 50 allows a user to measure detailed activity at the interface of the bridle bar 44 and the polished rod 50, which carries the sucker rod 40. The flexible magnetorestrictive waveguide 64 is typically installed in a flexible, reinforced tube 66. One such flexible magnetorestrictive waveguide is sold by MTS Systems Corporation located in Eden Prairie, Minn. under the TEMPOSONICS® trademark. As the horsehead 16 pump moves up and down, the magnetostrictive waveguide 64 follows the elliptical movement of the at least one cable 34 to maintain a vertical lift in reference to the well head casing 44.

With a linear position sensor 60 having a position magnet 62 attached to the polished rod 50, and the magnetorestrictive waveguide 64 attached to the at least one cable 34 proximate the bridle bar 44, an absolute position of the sucker rod 40 relative to the bridle bar 44 can be monitored. Besides being capable of monitoring the absolute position between the bridle bar 44 and the polished rod 50, the linear position sensor 60 is capable of providing a signal for determining a velocity of the bridle bar 44 relative to the polished rod 50, and/or an acceleration of the bridle bar 44 relative to the sucker rod 40 or the polished rod 50.

With a linear position sensor 60 having a position magnet 62 attached to the polished rod 50, and the magnetorestrictive waveguide 64 attached to the at least one cable 34 proximate the bridle bar 44, an output signal 47A of the position sensor 60 is provided and is proportional to the absolute position of the polished rod 50 relative to the bridle bar 44. Besides being capable of monitoring the absolute position between the bridle bar 44 and the polished rod 50, the output signal 47A of the linear position sensor 60 can be processed to provide a signal 47B proportional to a velocity of the bridle bar 44 and the polished rod 50, and/or a signal 47C proportional to an acceleration of the bridle bar 44 relative to the sucker rod 40 or the polished rod 50. If desired, processing can be performed by circuitry 49 that can be part of the position sensor 60 and/or a pump controller 72. Such circuitry 49 can be embodied with analog and/or digital processing components, which can also include a processor and suitable instructions embodied in a computer readable memory that when executed by the processor calculate the position, velocity and acceleration values from one or more of the signals 47A-47C.

The combination of the flexible magnetorestrictive waveguide 64 and the position magnet 62 monitors the polished rod 50 to the bridle bar 44 interface. During normal operation, the interface has no measurable movement as measured by the magnetostrictive waveguide 64 and the position magnet 62 as the bridle bar 44 and the polished rod 50 ride up and down with each other during the pump cycles. Positioning the flexible magnetorestrictive waveguide 64 along the at least one cable 34 and the position sensor 62 on the polished rod 50 keeps communication cables out of the area of the stuffing box 46 and the wellhead working area which is prone to damage.

When non-typical operation occurs, the rate of downward movement of the polished rod 50 differs from the rate of downward movement of the bridle bar 44 which causes a change of relative position of the bridle bar 44 and the polished rod 50. The sensor 60 measures the change in relative position of the bridle bar 44 relative to the polished rod 50 and provides a signal related the measured change of relative position. If the polished rod 50 stays at the same position, the measurement from the sensor 60 will increase at a constant velocity until the jack pump system 10 reaches the bottom of stroke, commonly referred to as bottom dead center (BDC). Once BDC is reached, horsehead 16 of the jack pump system 10 starts to move upward, and the measurement from the sensor 60 will decrease until the measured relative position is back to a normal or reference output. If the normal or reference output from the sensor 60 is not at reached at Top Dead Center (TDC), the upward movement of the bridle bar 44 will collide with the polished rod 50, sending a shock wave through the mechanical system of the pump jack system 10. If this is allowed to continue over repeated cycles, system damage will likely result.

Figure 3:
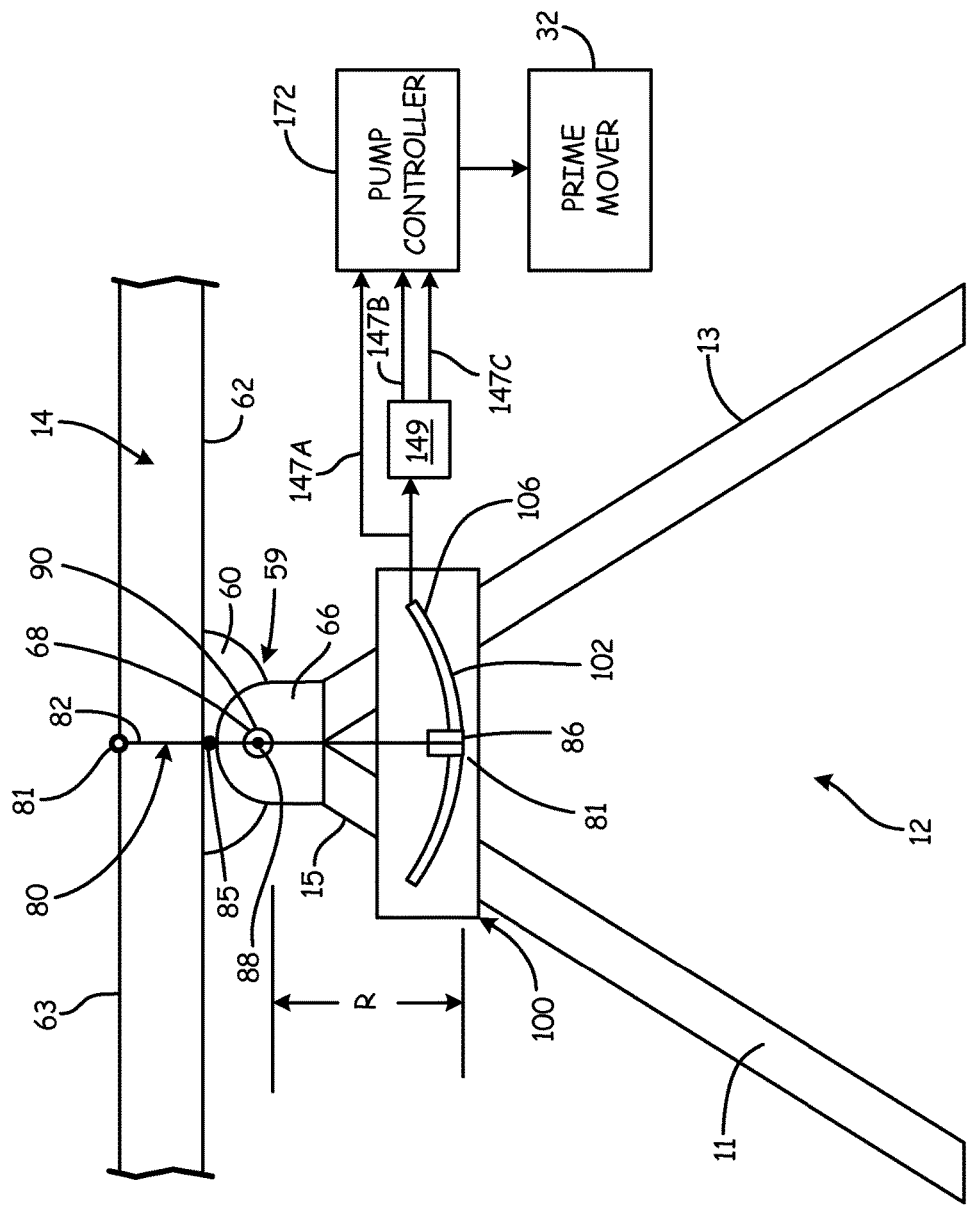
FIG. 3 is a schematic view of an interface between a walking beam and a base of a pump jack system with a position sensor attached thereto.

Referring to FIGS. 1 and 3, another aspect of the present disclosure is illustrated where a position sensor is located at a different location on a pump jack. As illustrated in FIG. 3, the walking beam 14 includes a first portion 60 of a mounting bracket 59 where the first portion 60 is secured to a portion 62 of the walking beam 14. The first portion 60 includes aligned apertures (not shown) that align with apertures (not shown) in a second portion 66 of the mounting bracket 59. The second portion 66 extends from the base 12, which typically includes a substantially "A-frame" construction with left and right angled members 11 and 13 that are joined at a top end 15. A pivot pin 68 is secured through the aligned apertures of the first and second portions 60 and 66 of the mounting bracket 59 to allow pivotal movement of the walking beam 14 relative to the base 12.

Figure 4:
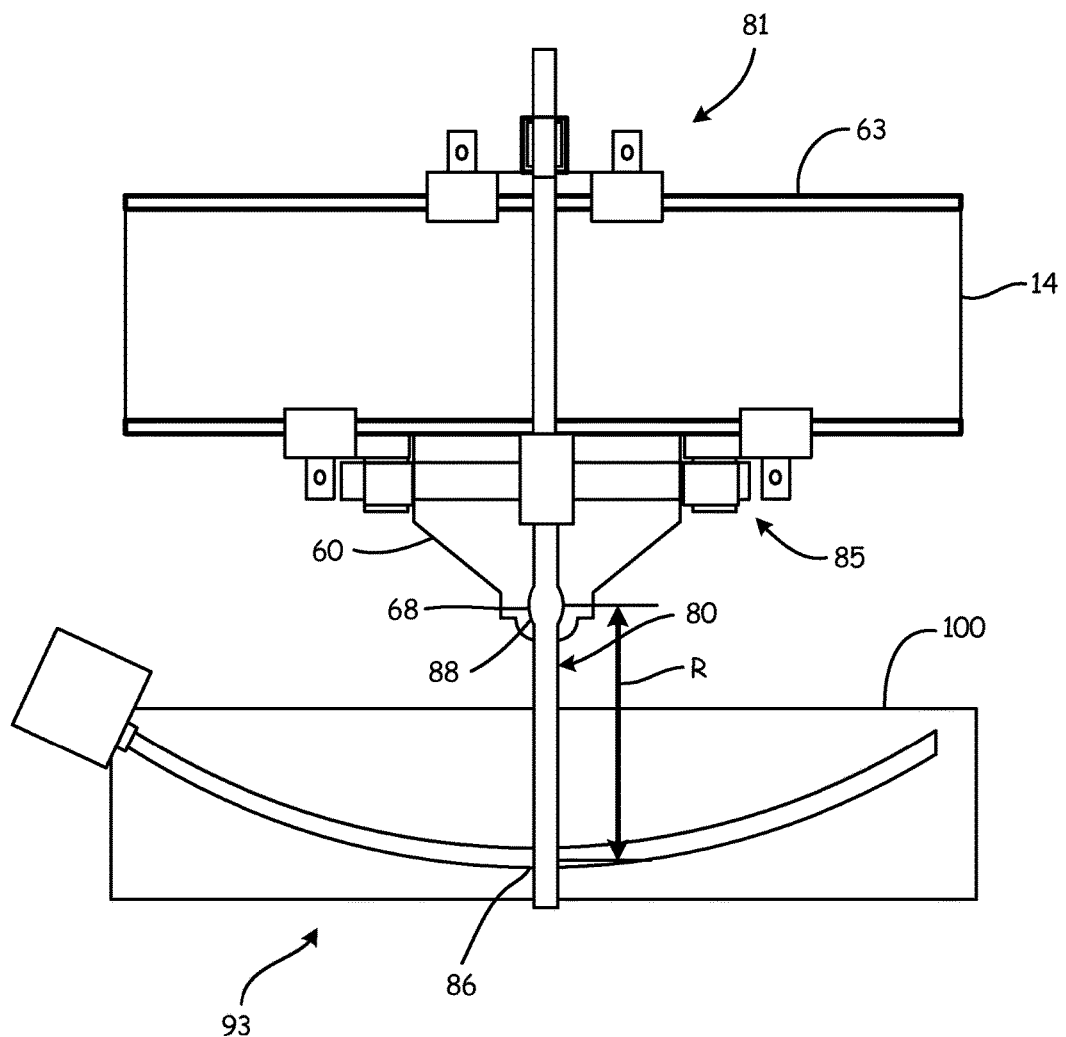
FIG. 4 is a side elevational view of a mounting arrangement for the position sensor.
Figure 5:
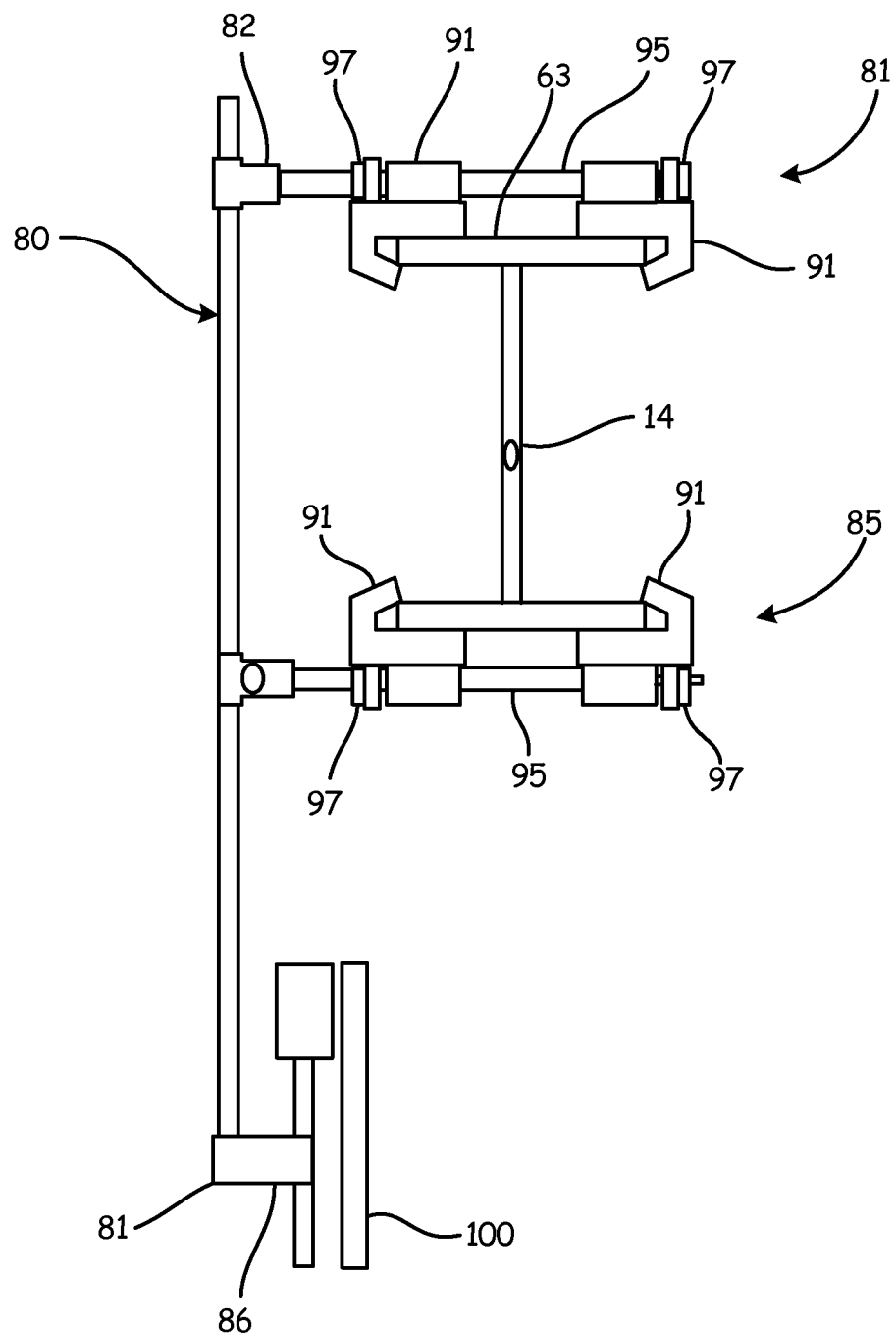
FIG. 5 is an end view of the mounting arrangement.

Referring also to FIGS. 4 and 5, a proximal end 82 of a pendulum arm 80 is fixedly attached to the walking beam 14, typically with at least a first mounting bracket 81, herein exemplified as being proximate a top surface 63 of the walking beam 14. It is contemplated that a second mounting bracket 85 be optionally secured a distance from the first mounting bracket 81 to provide rigidity to the pendulum arm 80 relative to the walking beam 14. One non-limiting location for the second mounting bracket 85 is on the bottom surface 62 of the walking beam 14. However, other locations for the first and second mounting brackets 81 and 85, respectively, for the pendulum arm 80 are also contemplated, provided the axis of rotation of the pendulum arm 80 aligns with the axis of rotation of the walking beam 14 about the pivot pin 68 and rotates with rotation of the walking beam 14.

In the embodiment illustrated, each of the first and second mounting brackets 81, 85 include self-aligning clamps 91 that engage opposite edges of the walking beam 14. A threaded rod 95 extends through bores provided in the clamps 91 and threaded nuts 97 secure the clamps 91 to each corresponding edge of the walking beam 14.

A magnet 86 is attached proximate a distal end 81 of the pendulum arm 80. The magnet 86 is positioned a length R from the axis of rotation 88 of the pendulum arm 80, where the axis of rotation 88 of the pendulum arm 80 that aligns with the axis of rotation 90 of the walking beam 14 about the pivot pin 68. Aligning the axis of rotation 88 of the pendulum arm 80 with the axis of rotation 90 of the walking beam 14 about the pivot pin 68 causes the magnet 86 to move in an arcuate path defined by the length R which is also the radius that defines the arcuate path. The magnet 86 is a first component of a position sensor 93.

A mounting plate 100 is typically attached to a stationary element of the base 12 with respect to pivotal movement of the walking beam 14, herein the stationary element is exemplified as the two beams 11 and 13 of the base 12 in FIG. 3. The mounting plate 100 is typically attached to the two beams 11 and 13 with brackets and bolts. However, other securing mechanisms besides brackets and bolts are also contemplated.

A magnetostrictive waveguide 102 is secured to the mounting plate 200 wherein the magnetostrictive waveguide 102 is configured to match the arcuate path 92 of the magnet 86, such that the position of the magnet 86 can be sensed by the magnetostrictive waveguide 102 of the position sensor 93 wherein the magnetostrictive waveguide 102 is a second component of the sensor 93. In one embodiment, the mounting plate 100 is of a sufficient size and secured to the two beams 11 and 13 in a location such that the entire arcuate path of the magnet 86 overlays the mounting plate 100. The resolution of the sensor 93 to the horsehead 16 movement can be increased by lengthening the pendulum arm 80 or conversely decrease by decreasing the length of the pendulum arm 80.

The position sensor 93 is typically a magnetostrictive sensor wherein the magnetostrictive waveguide 102 has a sufficient length to sense the entire arcuate path 92 of the magnet 86 throughout the travel of the magnet 86. Utilizing a magnetostrictive waveguide 102 (typically curved or arcuate in this aspect of the disclosure) secured to the base 12 allows measurement of detailed activity regarding, at least, the absolute position, velocity and acceleration of the walking beam 14 relative to the base 12 to be ascertained through the measured position of the magnet 86 relative to the waveguide 102. The flexible magnetorestrictive waveguide 102 is typically installed in a curved or arcuate reinforced tube 106. One such magnetorestrictive sensor is sold by MTS Systems Corporation located in Eden Prairie, Minn. under the TEMPOSONICS® trademark.

As the walking beam 14 pivots about the pivot pin 68, the magnet 86 follows the arcuate path 92, similar to that of the arcuate back and forth movement of a pendulum, and the position of the magnet 86 is sensed by the curved or arcuate magnetorestrictive waveguide 102.

With the position sensor 93 having a position magnet 86 attached to the arm 80 and moving with the pivotal movement of the walking beam 14, and the magnetorestrictive waveguide 104 attached to the base 12 through the mounting plate 100, an output signal 147A of the position sensor 93 is provided and is proportional to the absolute position of walking beam 14 relative to the base 12. Besides being capable of monitoring the absolute position between the walking beam 14 and the base 12, the output signal 147A of the position sensor 93 can be processed by a processor circuitry (analog and/or digital) 149 to provide a signal 147B proportional to a velocity of the walking arm 14, and/or a signal 147C proportional to an acceleration of the walking beam 14 relative to the base 12. If desired, the circuitry 149 can be part of the position sensor 93 and/or a controller 172. Such circuitry 149 can be embodied with analog and/or digital processing components, which can also include a processor and suitable instructions embodied in a computer readable memory that when executed by the processor calculate the position, velocity and acceleration values from one or more of the signals 147A-147C.

The combination of the curved or arcuate magnetorestrictive waveguide 104 and the position magnet 86 attached to the pendulum arm 80 monitors the movement of the walking beam 14 relative to the base 12. During normal operation, the movement of the walking arm 14 relative to the base 12 will be relatively consistent in its pivotal movement, velocity and/or acceleration. However variances in the pivotal movement, velocity and/or acceleration from established parameters can be indicative of mechanical issues with the pump jack system 10 or alternatively the measurements can be used to optimize the production of the pump jack system 10.

Although a magnetostrictive sensor is particularly well-suited for use in the present disclosure, other forms of position sensors can used. Generally, such a sensor includes an elongated component (e.g. the magnetostrictive waveguide of the magnetostrictive sensor) and a fixed component (e.g. the position magnet of the magnetostrictive sensor). As another example the position sensor can comprise a linear encoder. A linear encoder is a sensor, transducer or readhead paired with a scale that encodes position. The sensor reads the scale in order to convert the encoded position into an analog or digital signal, which can then be decoded into position by a digital readout (DRO) or motion controller. Motion can be determined by change in position over time. Linear encoder technologies include optical, magnetic, inductive, capacitive and eddy current. In an alternative embodiment, velocity and/or acceleration sensor(s) suitably mounted to appropriate moving components can also be used to provide and/or derive any of the position, velocity and/or acceleration signals that are then used to control the speed of the prime mover 32. In particular, using the signal 47A or 147A related to absolute position, and/or the signal 47B or 147B related to velocity, and/or the signal 47C or 147C related to acceleration, controller 72 or 172 is able to send a signal to the prime mover 32 to adjust the speed of the horsehead 16 and all equipment supported by the horsehead 16 to control the operation of the pump jack 10.

For instance in one scenario, the sucker rod 40 and the down-hole section 42 could stretch when raised from the bottom of a pump stroke. The amount of stretch can be significant, especially when utilized in a well with horizontal drilling. A determination that stretching is occurring can be based on a comparison of the position, velocity and/or acceleration signals 47A-47C, 147A-147C to empirical data and/or other characteristics of the position, velocity and/or acceleration signals 47A-47C, 147A-147C. If stretching of the sucker rod 40 and/or down-hole section 42 is determined to be occurring, or occurring beyond acceptable limits, the controller 72 or 172 can in turn send a signal to the prime mover 32 to slow down, such that the upward movement of the horsehead 16 and attached equipment is slowed down in order to minimize the likelihood of damage to the well or the down-hole equipment while stretching. Once no further stretching is detected, or stretching has returned to an acceptable level, the controller 72 or 172 can send a signal to increase the speed of the prime mover 32.

The position, velocity and/or acceleration signals 47A-47C, 147A-147C can also be used to sense or determine the position of the bridle bar 44 relative to the polished rod 50 anytime during the pumping cycle. For instance, during the downstroke of the pumping cycle, the polished rod 50, sucker rod 40 and down-hole section 42 of the pump are lowered through gravity, while the movement of the bridle bar 44 is a function of the movement of the horsehead 16. In the event that the downward movement of the sucker rod 40 or down-hole section 42 of the pump is impeded or inhibited in any manner such as when the down-hole portion 42 of the pump is slowly descending into the pool of liquid, which can be especially problematic when pumping heavy oil or oil containing significant amounts of solids, such as sand, then the bridle bar 44 will move at a faster rate than that of the sucker rod 40 and/or down-hole section 42 of the pump. This change in rate will cause the bridle bar 44 to separate from the top portion of the polished rod 50 and result in a characteristic change in absolute position, velocity and/or acceleration as measured or derived by the position, velocity and/or acceleration signals 47A-47C, 147A-147C. If the characteristics of the position, velocity and/or acceleration signals 47A-47C, 147A-147C correspond to separation of the bridle bar 44 from the polished rod 50, the controller 72 and 172 can control the prime mover 32 to slow down so as to cause the polished rod 50 to re-engage the bridle bar 44 to minimize the potential for damage to the pump jack 10 from impact between the bridle bar 44 in an up stroke portion of the pump cycle while the polished rode 50 is either stationary or in the downward portion of the pump cycle. Once contact between the bridle bar 44 and the polished rod 50 is detected by analysis of the position, velocity and/or acceleration signals 47A-47C, 147A-147C signals the controller 72 and 172 can speed up the prime mover 32.

The controller 72 and 172 can contain the control circuitry 49 and 149 or the control circuitry 49 and 149 can be associated with the sensor 60 and 93, respectively. The controller 72 and 172 can be configured to control a single prime mover 32 or the controller 72 and 172 can be configured to accept signals from multiple sensors 60 and 193 and control multiple prime movers 32.

Based on the position, velocity and/or acceleration signals 47A-47C, 147A-147C, the controller 72 and 172 can be configured to provide a signal regarding the process and operating conditions of the pump jack(s) on site. Alternatively or additionally, the controller 72 and 172 can transmit the data to a remote site, either through a standard wire communication service or a wireless connection such that the data from the controller can be viewed remotely.

The system is configured to store data regarding absolute position and/or velocity and/or acceleration for later analysis and/or transmit data to a remote location regarding absolute position and/or velocity and/or acceleration for later analysis. The system is configured to replace the standard dynacard that provided information about the performance of the pump jack that is typically available at the pump jack site.

The information obtained from the control system which includes the sensors 60 and 93, the control circuitry 49 and 149 and the controller 72 and 172 can be useful in diagnosing operating issues or the cause of failures. For instance, if the polished rod 50 continues to fall at a different rate then the bridle bar 44 or the polished rod 50 falls in impulse steps when the polished rod 50 is disconnected from the bridle bar 44, the acceleration and final position where the polished rod 50 stops can be recorded. This data can be useful in determining the cause of the failure for quicker diagnostics and repair of the jack pump system 10.

As a group or as individual data, the position, velocity and/or acceleration signals 47A-47C, 147A-147C can be used to optimize the energy consumption in the process of oil production. If not properly tuned at installation or as the pump jack system 10 runs and produces oil, the mechanical pump jack system 10 wears, and the well characteristics change. Processing of the position, velocity and/or acceleration signals 47A-47C, 147A-147C allows the operator to optimize the production from the well and to protect the capital investment by preventing mechanical failures such as slamming the polished rod 50 into the bridle bar 44. Further, in any condition that causes the polished rod 50 to disconnect from the bridle bar 44, the data can be used to stop the pump jack system 10 or vary the speed of the pump jack system 10 when reconnecting the polished rod 50 to the bridle bar 44 to limit or reduce the shock cause by the impact between the polished rod 50 and the bridle bar 44.

Further, the position, velocity and/or acceleration signals 47A-47C, 147A-147C data can be used for scheduling preventative maintenance and identify when sucker rod assembly 40 and 50 is operating out of expected performance parameters to alert the user of an abnormal interface between the bridle bar 44 and the polished rod 50.

This approach also allows for the pump control system to generate a surface dynagraph of a complete cycle of operation of the pump jack. The present approach provides more detail and accuracy over the complete cycle of operation of the pump jack by providing absolute position, and fine granularity of acceleration and velocity.

Although the present invention has been described with reference to preferred embodiments, workers skilled in the art will recognize that changes may be made in form and detail without departing from the spirit and scope of the invention.

What is claimed is:

1. A pump jack system comprising:
    a base having a frame extending upwardly;
    a walking beam pivotally secured to the frame to pivot about a pivot axis on the frame;
    a variable speed prime mover operably coupled to the walking beam to pivot the walking beam;
    a magnetostrictive sensor having a magnet secured to the walking beam to move therewith and a waveguide secured to the frame such that the waveguide detects a position of the magnet corresponding to a pivotal position of the walking beam relative to the base or frame wherein the magnetostrictive sensor is configured to send a signal proportional to a sensed absolute position of the walking beam relative to the base or frame or velocity and/or acceleration of the pivotal motion of the walking beam relative to the base or frame;
    process circuitry configured to accept the signal from the magnetostrictve sensor and configured to calculate an absolute position of the walking beam relative to the base or frame a velocity and/or an acceleration of the walking beam relative to the base or frame, the process circuitry configured to send a signal proportional to the calculated absolute position of the walking beam relative to the base or frame or velocity and/or acceleration of the walking beam relative to the base or frame; and
    a controller configured to receive the signal from the process circuitry and configured to send a signal to the prime mover to adjust the speed of the prime mover to adjust a rotational speed of the prime mover based on the sensing by the magnetostrictive sensor.

2. The pump jack system of claim 1 wherein the magnet is secured to a pendulum arm that is secured to the walking beam wherein the pendulum arm has a second pivot axis that aligns with the pivot axis of the walking beam and wherein the magnet is secured on the pendulum arm a distance from the second pivot axis.

3. The pump jack system of claim 2 wherein the waveguide is configured into an arcuate configuration having a radius approximately a length of the pendulum arm defined by the distance from the second pivot axis and the position of the magnet on the pendulum arm.

4. The pump jack system of claim 3 wherein the waveguide has a length sufficient to detect a position of the magnet through a complete pumping cycle of the pump jack system.

5. The pump jack system of claim 4 and further comprising a mounting plate secured to the frame and wherein the waveguide is secured to the mounting plate.

6. The pump jack system of claim 1 and further comprising:
    a gearbox coupled to the variable speed prime mover;
    a crank arm couple to the gearbox;
    a Pittman arm coupled to the crank arm;
    wherein the walking beam has a first end and a second end, an end of the Pittman arm pivotally attached to the first end of the walking beam;
    a horsehead attached to a second end of the walking beam;
    at least one cable having a first end and a second end, the first end of the cable attached to the horsehead;
    a bridle bar attached to the second end of the at least one cable;

a polished rod having a first end and a second end, the first end of the polished rod engaging the bridle bar;

a sucker rod having a first end and a second end, the first end of the sucker rod attached to the second end of the polished rod;

and a down-hole pump section attached to the second end of the sucker rod.

7. The pump jack system of claim 1 wherein the magnet is secured to the walking beam wherein pivotal motion of the walking beam causes pivotal motion of the magnet.

8. The pump jack system of claim 7 wherein the waveguide is secured to a mounting plate that is secured to the frame.

9. A method for controlling a pump jack system, the method comprising:

providing the pump jack system having a base with a frame extending upwardly and a walking beam pivotally connected to the frame, the walking beam pivoting about a pivot axis on the frame and a variable speed prime mover operably coupled to the walking beam to pivot the beam;

providing a magnetostrictive sensor having a magnet secured to the walking beam to move therewith and a waveguide secured to the frame such that the waveguide detects a position of the magnet corresponding to an absolute position of the walking beam relative to the base or frame;

sensing the absolute position of the walking beam relative to the base or frame or a velocity and/or an acceleration of pivotal motion of the walking beam relative to the base or frame with the magnetostrictive sensor;

sending a signal from the magnetostrictive sensor indicative of the absolute position of the walking beam relative to the base or frame or the velocity and/or the acceleration of pivotal motion of the walking beam relative to the base or frame to process circuitry;

sending a signal from the process circuitry to a controller related to the absolute position of the walking beam relative to the base or frame or the velocity and/or the acceleration of pivotal motion the walking beam relative to the base or frame;

and sending a signal from the controller to the prime mover to adjust a rotational speed of the prime mover to adjust the absolute position of the walking beam relative to the base or frame or the velocity and/or the acceleration of pivotal motion of the walking beam relative to the base or frame based on the sensing by the magnetostrictive sensor.

10. The method of claim 9 wherein providing the magnetostrictive sensor comprises:

securing the magnet to a pendulum arm and a pivot axis of the pendulum arm aligns with the pivot axis of the walking beam frame;

and securing the waveguide to the frame wherein the waveguide has an arcuate configuration with a radius substantialy the same as a distance from the magnet to the pivot axis of the pendulum arm such that the waveguide can detect the position of the magnet through an entire pump cycle.

11. The method of claim 9 wherein providing the magnetostrictive sensor on the pump jack system comprises: securing the magnet to the walking beam wherein pivotal motion of the walking beam causes pivotal motion of the magnet.

12. The method of claim 11 wherein providing the magnetostrictive sensor on the pump jack system comprises: securing the waveguide to a mounting plate that is secured to the frame.

* * * * *